United States Patent
Wang et al.

(10) Patent No.: US 7,982,342 B2
(45) Date of Patent: Jul. 19, 2011

(54) FUEL CELL POWER MANAGEMENT SYSTEM AND ANTI-ISLANDING METHOD IN THE POWER MANAGEMENT SYSTEM

(75) Inventors: Yong Wang, Youngin-si (KR); Dukjin Oh, Seoul (KR); Seeyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 12/360,391

(22) Filed: Jan. 27, 2009

(65) Prior Publication Data
US 2009/0302691 A1    Dec. 10, 2009

(30) Foreign Application Priority Data
Jun. 9, 2008    (KR) .................. 10-2008-0053819

(51) Int. Cl.
*H01H 83/00*    (2006.01)
(52) U.S. Cl. .............. 307/125; 307/30; 307/46; 307/85; 307/86; 307/112; 307/116
(58) Field of Classification Search ............ 307/30, 307/46, 85–86, 112, 116, 125
See application file for complete search history.

(56) References Cited

U.S. PATENT DOCUMENTS

| | | | | |
|---|---|---|---|---|
| 5,686,766 A * | 11/1997 | Tamechika | ...... | 307/43 |
| 6,219,623 B1 * | 4/2001 | Wills | ...... | 702/60 |
| 6,810,339 B2 * | 10/2004 | Wills | ...... | 702/65 |
| 6,856,497 B2 * | 2/2005 | Suzui et al. | ...... | 361/42 |
| 7,015,597 B2 * | 3/2006 | Colby et al. | ...... | 307/31 |
| 7,016,793 B2 * | 3/2006 | Ye et al. | ...... | 702/60 |
| 7,138,728 B2 * | 11/2006 | LeRow et al. | ...... | 307/30 |
| 7,248,946 B2 * | 7/2007 | Bashaw et al. | ...... | 700/286 |
| 7,262,520 B2 * | 8/2007 | Nguyen et al. | ...... | 307/86 |
| 7,304,403 B2 * | 12/2007 | Xu | ...... | 307/84 |
| 7,408,268 B1 * | 8/2008 | Nocentini et al. | ...... | 307/16 |
| 7,656,057 B2 * | 2/2010 | Wang et al. | ...... | 307/64 |
| 2004/0219399 A1 * | 11/2004 | Zhu et al. | ...... | 429/13 |
| 2006/0250024 A1 | 11/2006 | Taylor | | |
| 2007/0128482 A1 * | 6/2007 | Gu et al. | ...... | 429/22 |
| 2008/0118798 A1 * | 5/2008 | Gallagher | ...... | 429/23 |
| 2008/0204044 A1 * | 8/2008 | Ponnaluri et al. | ...... | 324/647 |
| 2008/0258554 A1 * | 10/2008 | Wang et al. | ...... | 307/17 |
| 2008/0278000 A1 * | 11/2008 | Capp et al. | ...... | 307/21 |

* cited by examiner

*Primary Examiner* — Jared J Fureman
*Assistant Examiner* — Adi Amrany
(74) *Attorney, Agent, or Firm* — Stein McEwen, LLP

(57) ABSTRACT

A fuel cell power management system and an anti-islanding method using the power management system. The power management system includes a fuel cell to generate direct current (DC) power, a power conditioning system (PCS) to generate alternating current (AC) power from the DC power generated by the fuel cell, a power grid that is connected to the PCS, a detector to detect a change in the AC power flowing from an output line of the PCS, and a controller to control the connection between the PCS and the power grid, according to the result of the detection.

9 Claims, 4 Drawing Sheets

FUEL CELL POWER MANAGEMENT SYSTEM AND ANTI-ISLANDING METHOD IN THE POWER MANAGEMENT SYSTEM

CROSS-REFERENCE TO RELATED APPLICATION

This application claims the benefit of Korean Patent Application No. 2008-53819, filed on Jun. 9, 2008, in the Korean Intellectual Property Office, the disclosure of which is incorporated herein, by reference.

BACKGROUND OF THE INVENTION

1. Field of the Invention

Various embodiments of the present invention relate to a fuel cell power management system, and an anti-islanding method using the system.

2. Description of the Related Art

Fuel cells are environmentally friendly energy sources that generate electric energy from, for example, hydrogen, and are highlighted, together with solar cells, as an alternative energy technology. Power generation systems using fuel cells can be classified as stand-alone systems, in which one fuel cell supplies electric power to load, and distributed generation systems that employ a plurality of fuel cells or solar cells to supply electric power to a power grid. A distributed generation system can collect small amounts of electric power output from each fuel cell, and can output large amounts electric power. In addition, even if some of the fuel cells break, other fuel cells can be used to compensate for the lost electric power, and thus, the electric power can be stably supplied. Due to the above advantages, distributed generation systems are being widely developed for domestic and/or industrial use.

FIG. 1 is a diagram illustrating an islanding phenomenon in a distributed generation system. Referring to FIG. 1, electric power is generated by a fuel cell system 12 and is supplied to a load 14, through a power grid 13. The islanding phenomenon refers to when the fuel cell system 12 continues to provide power to the load 14, when no electric power is supplied from the power grid 13. Such islanding phenomenon can damage a normal electric power transmission system, and/or may be harmful to an operator managing the fuel cell system 12 and damage user equipment. Therefore, an anti-islanding technology that disconnects the fuel cell system 12 from the power grid 13, when the electric power from other sources is not supplied to the power grid 13, is required.

SUMMARY OF THE INVENTION

Various embodiments of the present invention provide a fuel cell power management system capable of efficiently and stably preventing islanding, and an anti-islanding method using the fuel cell power management system.

Various embodiments of the present invention also provide a computer readable recording medium having embodied thereon a computer program for executing the anti-islanding method.

According to an aspect of the present invention, there is provided a power management system including: a fuel cell generating direct current (DC) power; a power conditioning system (PCS) generating alternating current (AC) power from the DC power generated by the fuel cell; a power grid that is connected to the PCS; a detector detecting a change in the AC power flowing from an output line of the PCS; and a controller controlling the connection between the PCS and the power grid, according to a detection result of the detector.

According to another aspect of the present invention, there is provided an anti-islanding method including: detecting a change in alternating current (AC) power flowing from an output line of a power conditioning system (PCS), which generates the AC power from direct current (DC) power that is generated by a fuel cell; and controlling a connection between the PCS and a power grid, according to the detection result.

According to another aspect of the present invention, there is provided a computer readable recording medium having embodied thereon a computer program for executing the anti-islanding method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which.

DETAILED DESCRIPTION OF THE EMBODIMENTS

Figure 1:
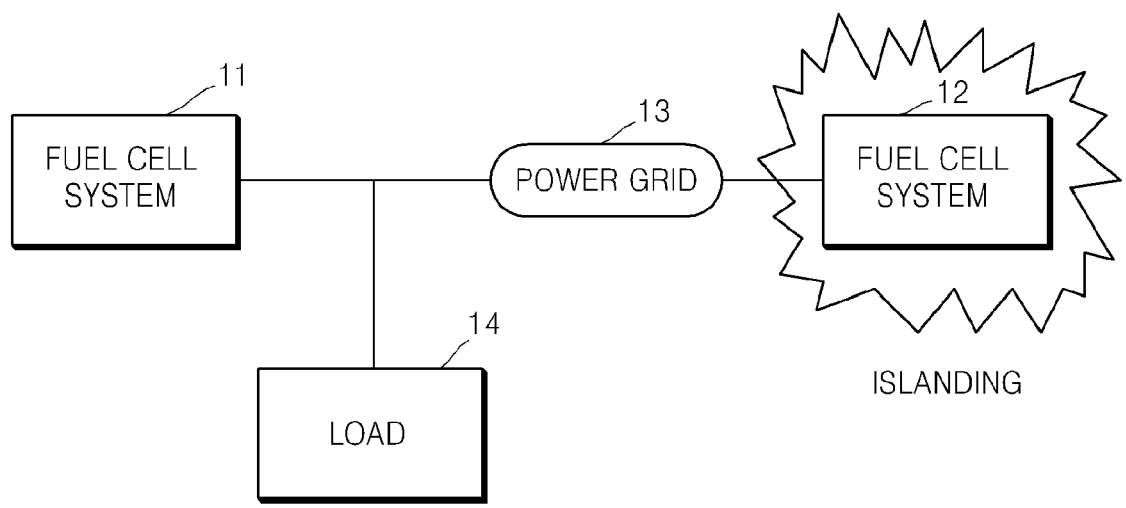
FIG. 1 is a diagram illustrating an islanding phenomenon in a distributed generation system.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
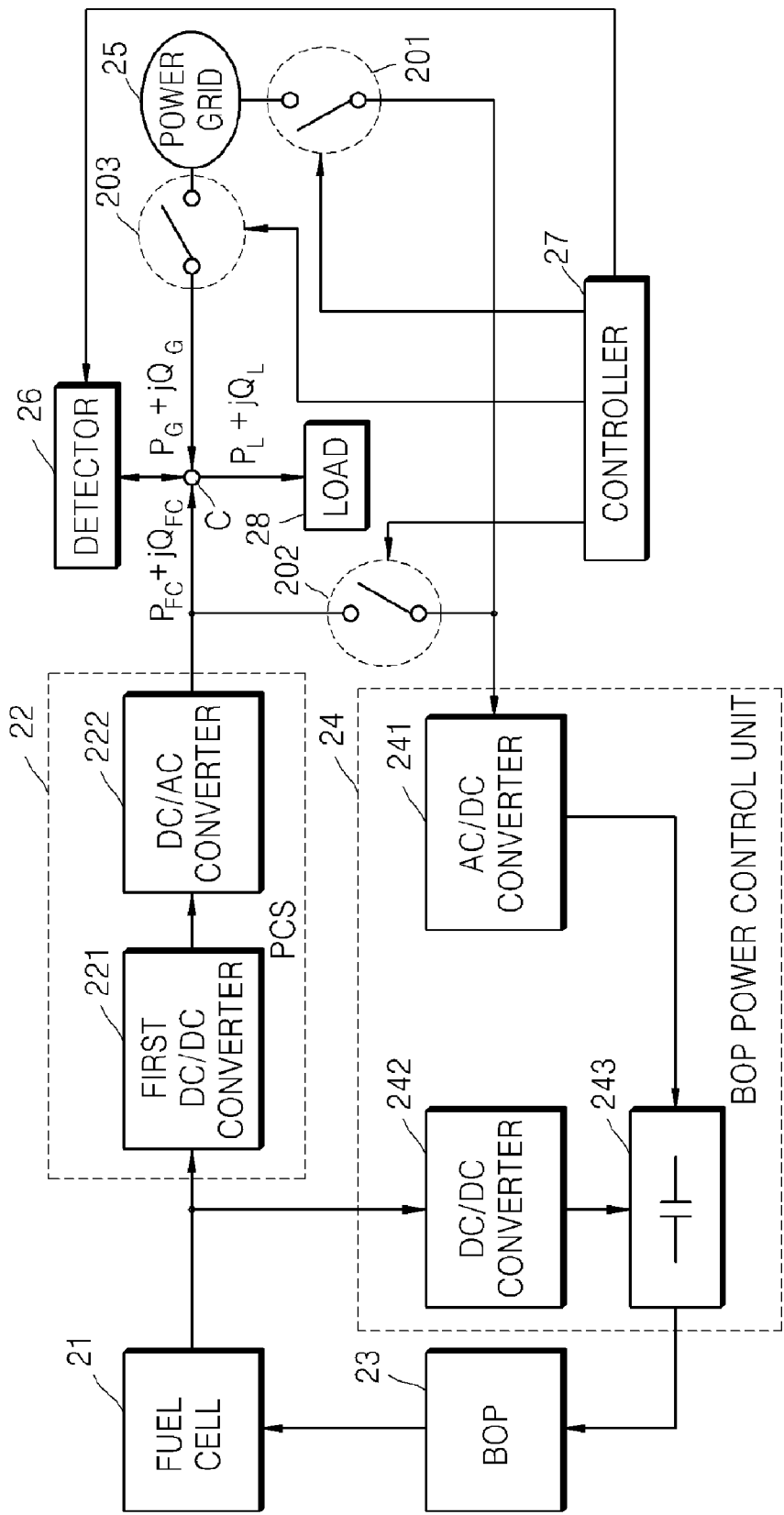
FIG. 2 is a block diagram of a power management system, according to an exemplary embodiment of the present invention.

FIG. 2 is a block diagram showing a power management system, according to an exemplary embodiment of the present invention. Referring to FIG. 2, the power management system includes a fuel cell 21, a power conditioning system (PCS) 22, a balance of plant (BOP) 23, a BOP power management unit 24, a power grid 25, a detector 26, a controller 27, a load 28, a first switch 201, a second switch 202, and a third switch 203.

The fuel cell 21 directly converts the chemical energy of a fuel into direct current (DC) power, using an electrochemical reaction. A solid oxide fuel cell (SOFC), a polymer electrolyte membrane fuel cell (PEMFC), or a direct methanol fuel cell (DMFC) can be used as the fuel cell 21. One of ordinary skill in the art would understand that a cell generating the DC power, such as a solar cell, can be used instead of, or in addition to the fuel cell 21.

The PCS 22 generates alternating current (AC) power from the DC power generated by the fuel cell 21. Referring to FIG.

2, the PCS 22 includes a first DC/DC converter 221 and a DC/AC converter 222. The first DC/DC converter 221 boosts the voltage of the DC power generated by the fuel cell 21, so as to correspond to a voltage level required by the load 28. The DC/AC converter 222 converts the boosted DC power into the AC power, and is generally referred to as an inverter.

The BOP 23 includes peripheral devices for driving the fuel cell 21, for example, a pump to supply fuel or air to the fuel cell 21. When the power management system is initiated, the BOP 23 operates using the electric power supplied from the power grid 25. When constant DC power is output from the fuel cell 21, the BOP 23 operates using the electric power supplied from the fuel cell 21. The above process is described below in detail.

The BOP power management unit 24 supplies the electric power to drive the BOP 23. Referring to FIG. 2, the BOP power management unit 24 includes an AC/DC converter 241, a second DC/DC converter 242, and a capacitor 243. The AC/DC converter 241 converts some of the electric power supplied from the power grid 25, or some of the AC power generated by the PCS 22, into DC power, which is stored in the capacitor 243. In particular, according to the present exemplary embodiment, the AC/DC converter 241 regularly draws some of the electric power of the PCS 22 (for example, about 2%), in order to control the load balance at a common point C, where the PCS 22, the power grid 25, and the load 28 are connected to each other.

The second DC/DC converter 242 converts some of the DC power generated by the fuel cell 21 into the DC power that is also stored in the capacitor 243, when a constant DC power is output from the fuel cell 21. The capacitor 243 stores the DC power generated by the AC/DC converter 241 and/or the second DC/DC converter 242. A super capacitor or a rechargeable battery can be used as the capacitor 243. When a super capacitor having a large capacity is used as the capacitor 243, the electric power can be stably supplied to the BOP 23.

In a distributed generation system, the power grid 25 connects small-scale power generation devices, such as a fuel cell system or a solar cell system. The distributed generation system collects the electric power from the small-scale power generation devices, which are distributed in various locations, and supplies the collected power to the load 28, through the power grid 25. In particular, when the power generated by a main power generation device fluctuates, the power grid 25 can compensate for the fluctuation, using the electric power generated by other power generation device, and thus, the electric power can be stably supplied to the load 28.

The detector 26 detects a change in the AC power flowing from an output line of the PCS 22. For example, the detector 26 can detect a change in the root-mean-square (RMS) voltage of the AC power flowing from the output line of the PCS 22. In more detail, when the change in the RMS voltage of the AC power exceeds a predetermined critical value (for example, 10 V), the detector 26 determines that the AC power has changed. Alternatively, the detector 26 may detect a change in the frequency of the AC power flowing from the output line of the PCS 22. In more detail, when the change in the frequency of the AC power exceeds a predetermined critical value (for example, 0.3 Hz), the detector 26 determines that the AC power has changed.

The first switch 201 is installed between the power grid 25 and the AC/DC converter 241. The second switch 202 is installed between the PCS 22 and the AC/DC converter 241. The third switch 203 is installed between the PCS 22 and the power grid 25.

When the power management system is initiated, the controller 27 connects the power grid 25 to the AC/DC converter 241, and disconnects the PCS 22 from the AC/DC converter 241, by controlling the first switch 201 and the second switch 202. That is, when the power management system is initiated, the controller 27 turns on the first switch 201 and turns off the second switch 202. Then, the AC power output from the power grid 25 is input to the load 28 and the AC/DC converter 241. The AC power input to the AC/DC converter 241 is converted into the DC power that is then stored in the capacitor 243. The DC power stored in the capacitor 243 is used to drive the BOP 23.

When the DC power is constantly output from the fuel cell 21, after the power management system is initiated, the controller 27 disconnects the power grid 25 from the AC/DC converter 241 and connects the PCS 22 to the AC/DC converter 241, by controlling the operation of the first and second switches 201 and 202. That is, when the DC power is constantly output from the fuel cell 21, after the power management system is initiated, the controller 27 turns off the first switch 201 and turns on the second switch 202. Then, the AC power output from the PCS 22 is input to the load 28 and the AC/DC converter 241. The AC power input to the AC/DC converter 241 is converted into the DC power that is then stored in the capacitor 243, together with the DC power output from the second DC/DC converter 242. The DC power stored in the capacitor 243 is used to drive the BOP 23. In particular, the AC/DC converter 241 regularly draws about 2% of the entire power output of the PCS 22, in order to control the load balancing at the point C. An unbalanced load can be compensated for using the power supplied from the power grid 25.

In addition, the controller 27 controls a connection between the PCS 22 and the power grid 25, by controlling the third switch 203, according to a detection result of the detector 26. That is, when the detector 26 detects a change in the AC power flowing from the output line of the PCS 22, the controller 27 disconnects the PCS 22 from the power grid 25.

In a fuel cell system, power from the power grid 25 is generally used to drive the BOP 23, during a startup period (initiation) of the fuel cell system, and the capacitor 243 is used to drive the BOP 23, after the fuel cell system has been initiated. In the present exemplary embodiment, the DC power output from the AC/DC converter 241 and the DC power output from the second DC/DC converter 242 are used to drive the BOP 23. Thus, the power output from the PCS 22 changes the load balance at the point C and is used to drive the BOP 23. In particular, a fluctuation of the power of the PCS 22, which is caused by a generation of the islanding phenomena in the distributed generation system, is also used to drive the BOP 23.

When AC power is supplied by the power grid 25, the load balancing of active power $P_L$ and reactive power $Q_L$, at the point C (where the PCS 22, the power grid 25, and the load 28 are connected to each other) can be represented as Equations 1 and 2 below. In Equation 1, $P_L$ denotes the active power at the load 28, $P_{FC}$ denotes the active power on the output line of the PCS 22, and $P_G$ denotes the active power at the power grid 25.

$$P_L = P_{FC} + P_G = \frac{V_L^2}{R} \qquad (1)$$

$$Q_L = Q_{FC} + Q_G = V_L^2 \times [(\omega L)^{-1} + \omega C] \qquad (2)$$

As described above, the AC/DC converter 241 regularly draws about 2% of the power of the PCS 22, in order to control the load balancing at the point C. Accordingly, an unbalanced load at the point C is generated and compensated for, using the power supplied from the power grid 25. That is, even when the power at the point C fluctuates, the load balancing of the point C can be maintained, due to the power supplied from the power grid 25. However, when no AC power is supplied from the power grid 25, the load balancing at the point C cannot be maintained. In addition, as represented by Equations 3 and 4 below, the active power and the reactive power at the load 28 do not match the active power and the reactive power on the output line of the PCS 22.

$$P_L = \frac{V_L^2}{R} \neq P_{FC} \qquad (3)$$

$$Q_L = V_L^2 \times [(\omega L)^{-1} + \omega C] \neq Q_{FC} \qquad (4)$$

Due to the unbalanced loads denoted by Equations 3 and 4 above, the load must be rebalanced at the point C. Until the load is balanced at the point C, the RMS voltage, or the frequency of the AC power flowing from the output line of the PCS 22, fluctuates greatly. The detector 26 can detect such change in the AC power, based on the change in the RMS voltage or frequency of the AC power. In addition, the excess power of the PCS 22 is stored in the capacitor 243, so as to drive the BOP 23. Due to the storage of the excess power, the load balancing at the point C can be optimized, and the power of the PCS 22 can be undisturbed.

Figure 3:
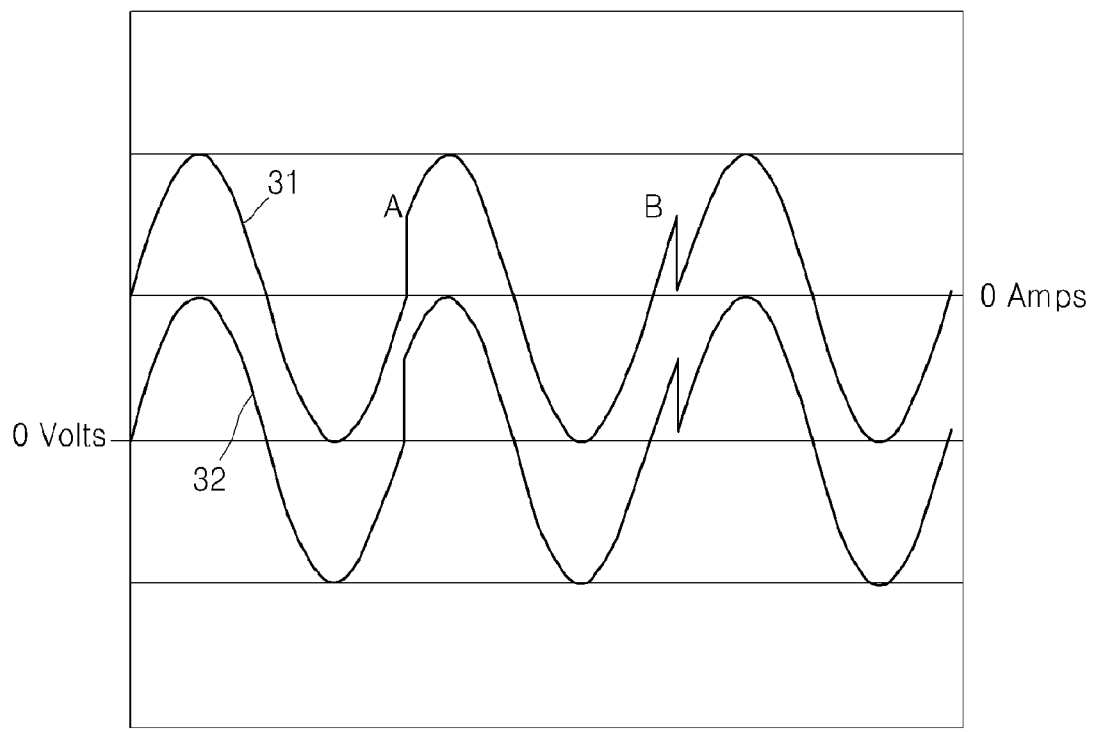
FIG. 3 is a graph showing waveforms of current and voltage detected, according to a conventional islanding detecting method.

FIG. 3 is a graph showing waveforms of a voltage and a current, which were detected according to a conventional islanding detection method. The conventional islanding detection method changes the AC power in the PCS, or in the previous process of the PCS. For example, US Patent Application Publication No. 2006-0250024 discloses a typical islanding detection method which periodically shifts the phase of an electric current 31 output from the PCS. In particular, the current waveform 11 is abruptly shifted ahead at the node A (by 33.75 degrees) and shifted back at the node B point (one cycle later). When AC power is supplied from the power grid, a waveform of a voltage 32 does not follow the waveform of the current 31, because the voltage waveform is the same as the waveform of the voltage from the power grid 25. However, when no AC power is supplied from the power grid, as shown in FIG. 3, the waveform of the voltage 32 follows the waveform of the current 31. According to US Patent Application Publication No. 2006-0250024, the islanding in the distributed generation system can be detected by measuring the change in the voltage waveform.

However, according to US Patent Application Publication No. 2006-0250024, since an intentional fluctuation is applied to the AC power output from the PCS, in order to detect the islanding in the distributed generation system, the power output of the PCS is degraded. In addition, in order to provide the level of AC power required by the load, which changes locally, the fuel cell must be driven more, as compared to when a constant power is supplied. Accordingly, the lifespan of the fuel cell may be reduced. Moreover, the fuel consumption of the fuel cell increases.

Figure 4:
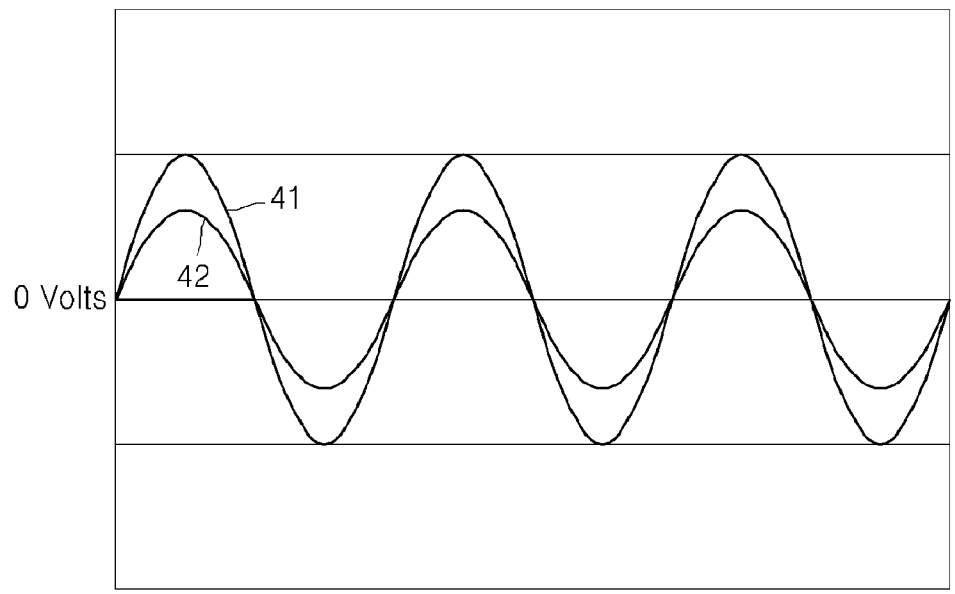
FIG. 4 is a graph showing a waveform of a voltage detected by a detector shown in FIG. 2.

FIG. 4 is a graph showing a voltage waveform 41 detected by the detector 26 of FIG. 2. The voltage waveform 41 is detected when islanding was not occurring in the distributed generation system. A voltage waveform 42 was detected when the islanding was occurring in the distributed generation system. The RMS voltage at the point C decreased however, the RMS voltage may be reduced or increased, according to a change in an impedance of the power grid 25. The frequency of the power detected by the detector 26 is not shown in FIG. 4, however, the frequency was assumed to be similar.

As described above, in the present exemplary embodiments, islanding in the distributed generation system can be detected, according to a change in the AC power flowing from the output line of the PCS 22, without altering the waveform of the AC power output from the PCS 22. Then the islanding control is performed. Therefore, the control of the islanding does not directly affect the PCS 22, and thus, the power output from the PCS 22 is not degraded. In addition, since the power management system can supply constant power, the lifespan of the fuel cell 21 may increase, and the fuel consumption of the fuel cell 21 can be reduced.

Figure 5:
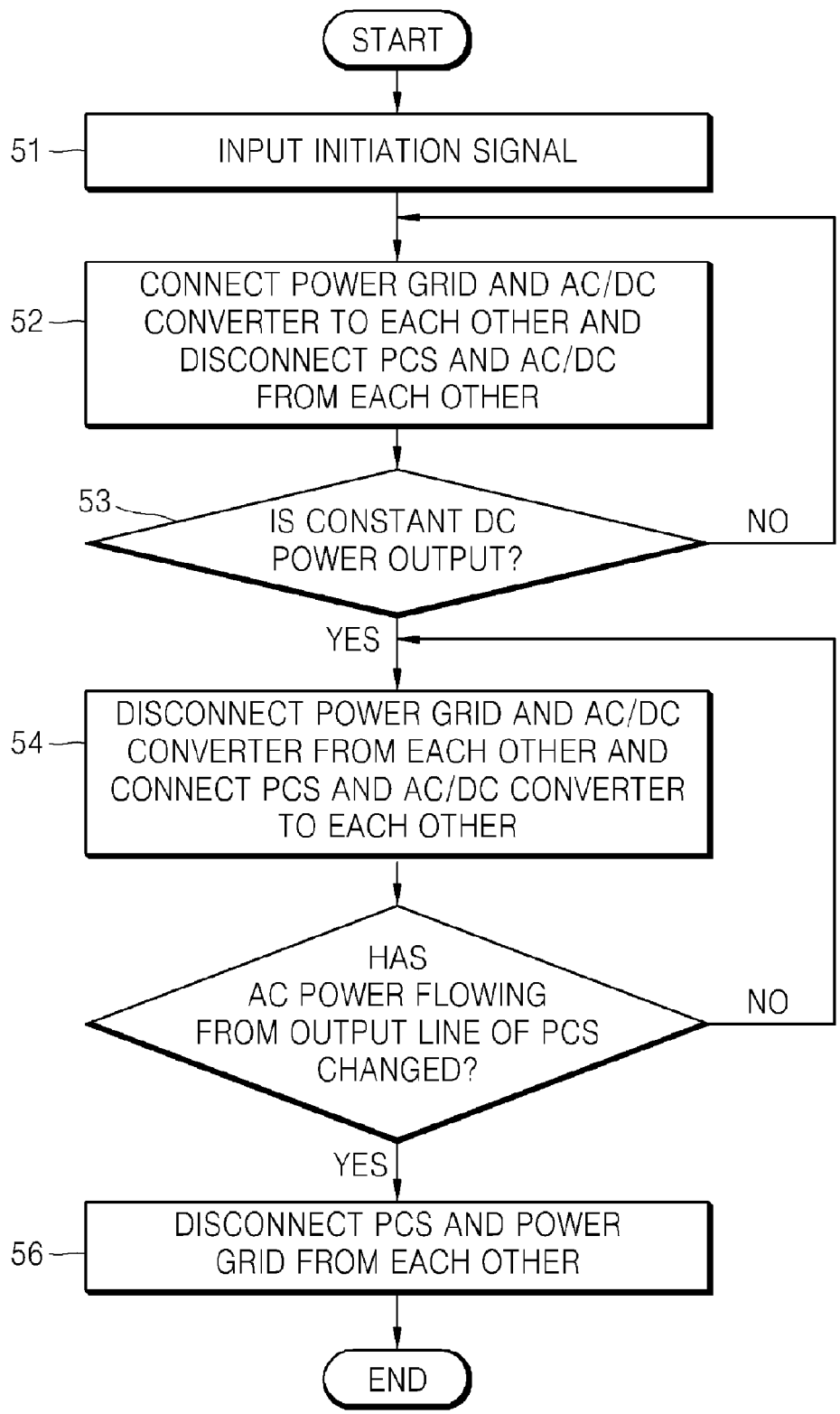
FIG. 5 is a flowchart illustrating an anti-islanding method, according to an exemplary embodiment of the present invention.

FIG. 5 is a flowchart illustrating an anti-islanding method, according to an exemplary embodiment of the present invention. Referring to FIG. 5, the anti-islanding method includes time-series processes that are performed in the power management system of FIG. 2. In operation S51, the power management system receives an initiation signal, according to an operation of a user.

In operation S52, the power management system connects the power grid 25 to the AC/DC converter 241 and disconnects the PCS 22 from the AC/DC converter 241. The AC power output from the power grid 25 is input to the load 28 and the AC/DC converter 241. The AC power input to the AC/DC converter 241 is converted into DC power that is then stored in the capacitor 243. The DC power stored in the capacitor 243 is used to drive the BOP 23.

In operation S53, if the power management system detects that a constant DC power is output from the fuel cell 21, the method proceeds to operation S54. Otherwise, the method proceeds to operation S52.

In operation S54, the power management system disconnects the power grid 25 from the AC/DC converter 241 and connects the PCS 22 to the AC/DC converter 241. The AC power output from the PCS 22 is input to the load 28 and the AC/DC converter 241. The AC power input to the AC/DC converter 241 is converted into DC power that is then stored in the capacitor 243, along with the DC power output from the DC/DC converter 242. The DC power stored in the capacitor 243 is used to drive the BOP 23.

In operation S55, if a change in the AC power flowing from the output line of the PCS 22 is detected, the method proceeds to operation S54. Otherwise, the method proceeds to operation S56. In operation S56, the power management system disconnects the PCS 22 from the power grid 25.

Exemplary embodiments of the present invention can be embodied as computer programs stored on a computer readable recording medium and can be implemented in general-use digital computers that execute the programs, using the computer readable recording medium. Examples of the computer readable recording medium include magnetic storage media (e.g., ROM, floppy disks, hard disks, etc.), and optical recording media (e.g., CD-ROMs, or DVDs).

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:
1. A power management system comprising:
a fuel cell to generate direct current (DC) power;
a power conditioning system (PCS) to convert the DC power to alternating current (AC) power;

an AC/DC converter to regularly draw and convert some of the AC power of the PCS, to DC power for driving a BOP (Balance Of Plant);

a power grid that is connected to the PCS;

a detector to detect a change in the AC power flowing from an output line of the PCS; and a controller to control the connection of the PCS and the power grid, according to the change detected by the detector, wherein the controller disconnects the PCS from the power grid, when the detected change exceeds a critical value based on the drawing of the AC/DC converter.

2. The power management system of claim 1, wherein the detector detects a change in the root-mean-square (RMS) voltage of the AC power flowing from the output line of the PCS.

3. The power management system of claim 1, wherein the detector detects a change in the frequency of the AC power flowing from the output line of the PCS.

4. The power management system of claim 1, wherein the controller disconnects the power grid from the AC/DC converter and connects the PCS to the AC/DC converter, when a constant DC voltage is output from the fuel cell, after the power management system is initiated.

5. An anti-islanding method comprising:

detecting a change in alternating current (AC) power flowing from an output line of a power conditioning system (PCS) that converts direct current (DC) power generated by a fuel cell into the AC power; and controlling a connection between the PCS and a power grid, according to the detected change, wherein the controlling of the connection comprises disconnecting the PCS from the power grid, when the detected change exceeds a critical value based on the drawing of an AC/DC converter to regularly draw and convert some of the AC power of the PCS, to DC power for driving a BOP (Balance Of Plant).

6. The anti-islanding method of claim 5, wherein the detecting of the change in the AC power is based on a change in the root-mean-square (RMS) voltage of the AC power of the output line of the PCS.

7. The anti-islanding method of claim 5, wherein the detecting of the change in the AC power is based on a change in the frequency of the AC power of the output line of the PCS.

8. The anti-islanding method of claim 5, wherein the controlling of the connection comprises disconnecting the power grid from the AC/DC converter and connecting the PCS to the AC/DC converter to each other, when a constant DC power is output from the fuel cell, after the fuel cell is initiated.

9. A non-transitory computer readable recording medium having embodied thereon a computer program for executing an anti-islanding method comprising:

detecting a change in alternating current (AC) power flowing from an output line of a power conditioning system (PCS) that converts the AC power from direct current (DC) power that is generated by a fuel cell; and controlling a connection between the PCS and a power grid, according to the detected change, wherein the controlling of the connection comprises disconnecting the PCS from the power grid, when the detected change exceeds a critical value based on the drawing of an AC/DC converter to regularly draw and convert some of the AC power of the PCS, to DC power for driving a BOP (Balance Of Plant).

* * * * *